United States Patent
Iwatsuki (10) Patent No.: US 7,913,026 B2
(45) Date of Patent: Mar. 22, 2011

(54) DATA TRANSFER APPARATUS, INFORMATION PROCESSING APPARATUS, AND DATA TRANSFER METHOD

(75) Inventor: Ryuji Iwatsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/405,301

(22) Filed: Mar. 17, 2009

(65) Prior Publication Data

US 2009/0327538 A1    Dec. 31, 2009

(30) Foreign Application Priority Data

Jun. 27, 2008  (JP) ................................. 2008-168469

(51) Int. Cl.
G06F 13/36  (2006.01)
(52) U.S. Cl. ...................... 710/315; 710/306; 710/311
(58) Field of Classification Search .................. 710/306, 710/311, 315
See application file for complete search history.

(56) References Cited

U.S. PATENT DOCUMENTS

| 6,560,233 B1 * | 5/2003 | Hatanaka et al. | 370/401 |
| 7,715,433 B2 * | 5/2010 | Boren | 370/466 |

FOREIGN PATENT DOCUMENTS

JP   2000-293441   10/2000

* cited by examiner

Primary Examiner — Thomas J Cleary
Assistant Examiner — Jeremy S Cerullo
(74) Attorney, Agent, or Firm — Staas & Halsey LLP (57) ABSTRACT

Provided is a data transfer apparatus having a system bus interface 20 connected to an MC 51, a high-speed I/O bus interface connected to a high-speed I/O bus switch 54, a history selection controller 10 that selects part of transmission/reception data transferred between the MC 51 and high-speed I/O bus switch 54, a buffer section 11 that is connected to the history selection controller 10 and retains the part of the transmission/reception data selected by the history selection controller 10, and a low-speed bus interface that outputs the part of the transmission/reception data retained by the buffer section 11 to an observation apparatus 200.

12 Claims, 11 Drawing Sheets

DATA TRANSFER APPARATUS, INFORMATION PROCESSING APPARATUS, AND DATA TRANSFER METHOD

CROSS-REFERENCE TO RELATED APPLICATIONS

This application is based upon and claims the benefit of priority of the prior Japanese Patent Application No. 2008-168469, filed on Jun. 27, 2008, the entire contents of which are incorporated herein by reference.

FIELD

The present invention relates to a data transfer apparatus and a data transfer method for allowing record of a transmission/reception history of a bus connecting between LSIs mounted on a server or the like and an information processing apparatus provided with the data transfer apparatus.

BACKGROUND

In recent years, the speed of a bus connecting LSIs mounted on a server has reached several GHz. An expensive high-speed bus logic analyzer is required in order to record a transmission/reception history of transactions between LSIs for failure analysis.

Figure 12:
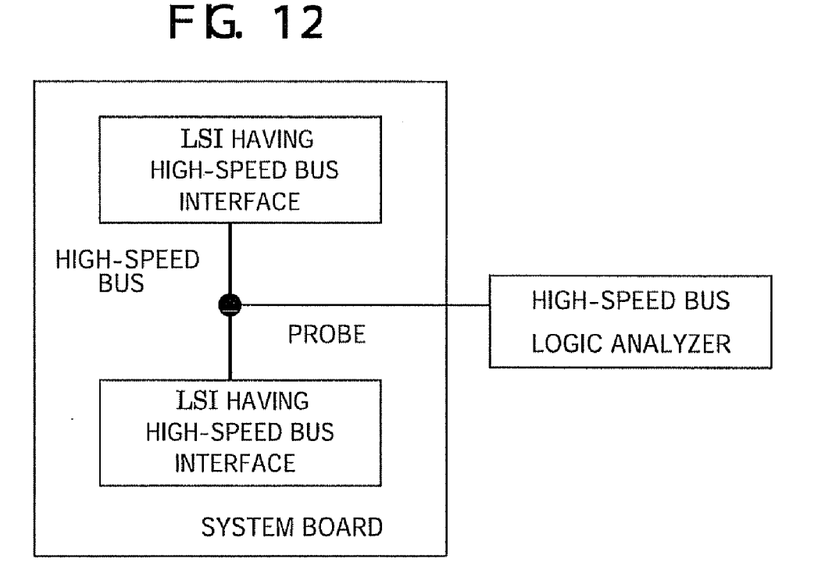
FIG. 12 is a view illustrating a configuration utilizing a method of directly probing a high-speed bus, which is one of conventional methods for recording transmission/reception history of transactions of an inter-LSI bus.

FIG. 12 illustrates a configuration utilizing a method of directly probing a high-speed bus, which is one of conventional methods for recording transmission/reception history of transactions of an inter-LSI bus.

An LSI having a high-speed bus interface is an LSI connected to a bus having a transfer frequency of several hundred MHz or more. A high-speed bus is a line of a system board in which a transfer rate of several hundred MHz or more is achieved. A high-speed bus logic analyzer is an observation apparatus specialized for a specific high-speed bus and has a sampling frequency of about several ten GHz. The system board carries LSIs each having a high-speed bus interface on its board substrate. The high-speed bus on the system board and high-speed bus logic analyzer are connected by a probe.

Operation of the conventional inter-LSI bus in the configuration illustrated in FIG. 12 will be described. The high-speed bus for recording a transmission/reception history of transactions and logic analyzer are directly connected by the probe. The transmission/reception history of transactions is recorded in the logic analyzer by an amount corresponding to the capacity of the storage area provided in the logic analyzer.

Figure 13:
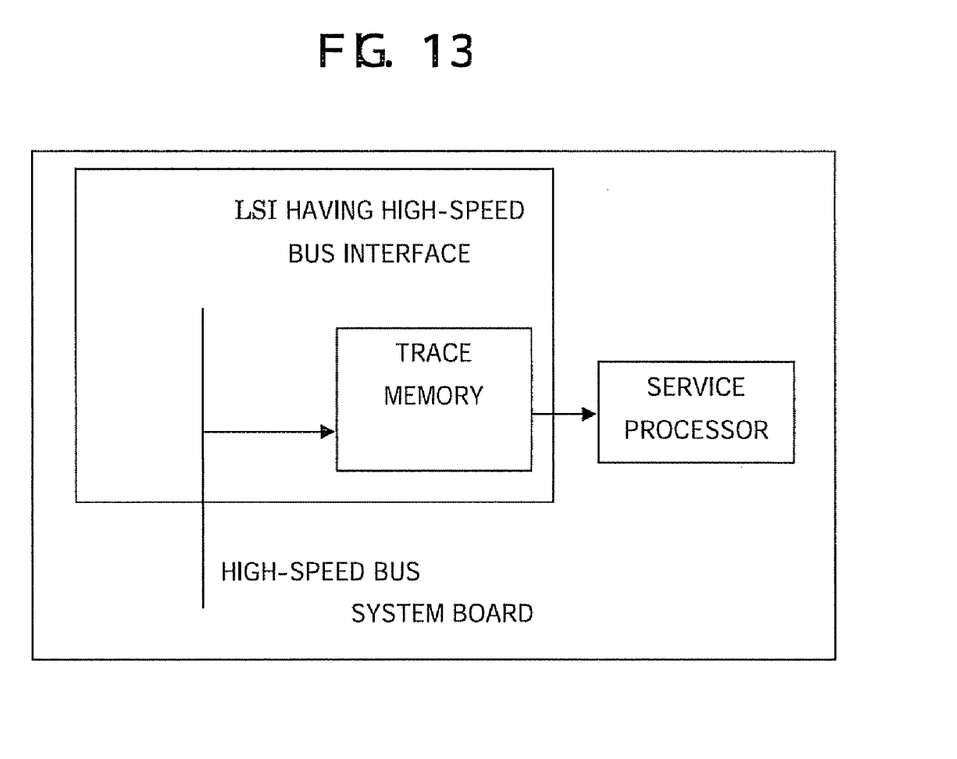
FIG. 13 is a view illustrating a conventional configuration utilizing a method in which a trace memory for recording a transaction transmission/reception history is provided inside the LSI.

FIG. 13 illustrates a configuration utilizing a method in which a trace memory for recording a transaction transmission/reception history is provided inside the LSI, which is one of conventional methods for recording transmission/reception history of transactions of the high-speed bus.

The LSI having the high-speed bus interface and high-speed bus are the same as those in FIG. 12. The trace memory for recording a transmission/reception history is a trace memory which is provided inside the LSI and is used for recording transactions transmitted/received through the high-speed bus. When the trace memory is full of the history, the recorded history information is overwritten sequentially from the oldest. The recording of the history is stopped using a transaction event such as exception handling as a trigger. Only while the history recording to the trace memory is in stopped state, the history information recorded in the trace memory is read out into a service processor.

Operation of the transaction transmission/reception history recording method illustrated in FIG. 13 will be described. The trace memory for recording a transmission/reception history is set to a recordable state using an event for starting the transmission/reception history recording as a trigger. During this recordable state, a transaction is transmitted through the high-speed bus to or from the LSI and, at the same time, the transaction is recorded in the trace memory. When the trace memory is full, the recorded information is overwritten sequentially from the oldest. The trace memory is set to a recording stop state using an event that stops the transmission/reception history recording, such as exception handling, as a trigger.

While the trace memory is in recording stopped state, the history information recorded in the trace memory is read out into the service processor. Accordingly, the reception history corresponding to the capacity of the trace memory is recorded.

[Patent Document 1]

Japanese Laid-open Patent Publication No. 2000-293441

However, the above conventional method in which the transaction transmission/reception history is recorded in the high-speed bus logic analyzer has the following problems:

The logic analyzer specialized for the high-speed bus is necessarily expensive because "sampling frequency is high", "there is a need to perform signal restoration depending on individual protocols in order to increase signal integrity", or the like.

Since the probe is directly connected to the high-speed bus on the system board, signal integrity is deteriorated due to influence of signal reflection or the like. Thus, an implementation for ensuring the signal integrity is required for the system board.

Further, in the case of the method in which the trace memory for recording a transmission/reception history is provided inside the LSI, the storage size of the trace memory provided inside the LSI as a transmission/reception history storage area becomes very small. In a configuration having one CPU and one DMA transfer device, there is a possibility that a transmission/reception history required for carrying out failure analysis can be collected even if the storage size of the trace memory is small. However, in recent years, a server is often provided with a plurality of CPUs and a plurality of DMA transfer devices, so that there may be a case where a transaction to be checked does not remain in the trace memory.

SUMMARY

According to an aspect of the present invention, there is provided a data transfer apparatus including: a first port connected to a first controller; a second port connected to a second controller; a data selection controller that selects part of transmission/reception data transferred between the first controller and second controller; a history storage section that is connected to the data selection controller and retains the part of transmission/reception data selected by the data selection controller; and a third port that outputs the part of transmission/reception data retained by the history storage section to an analysis apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
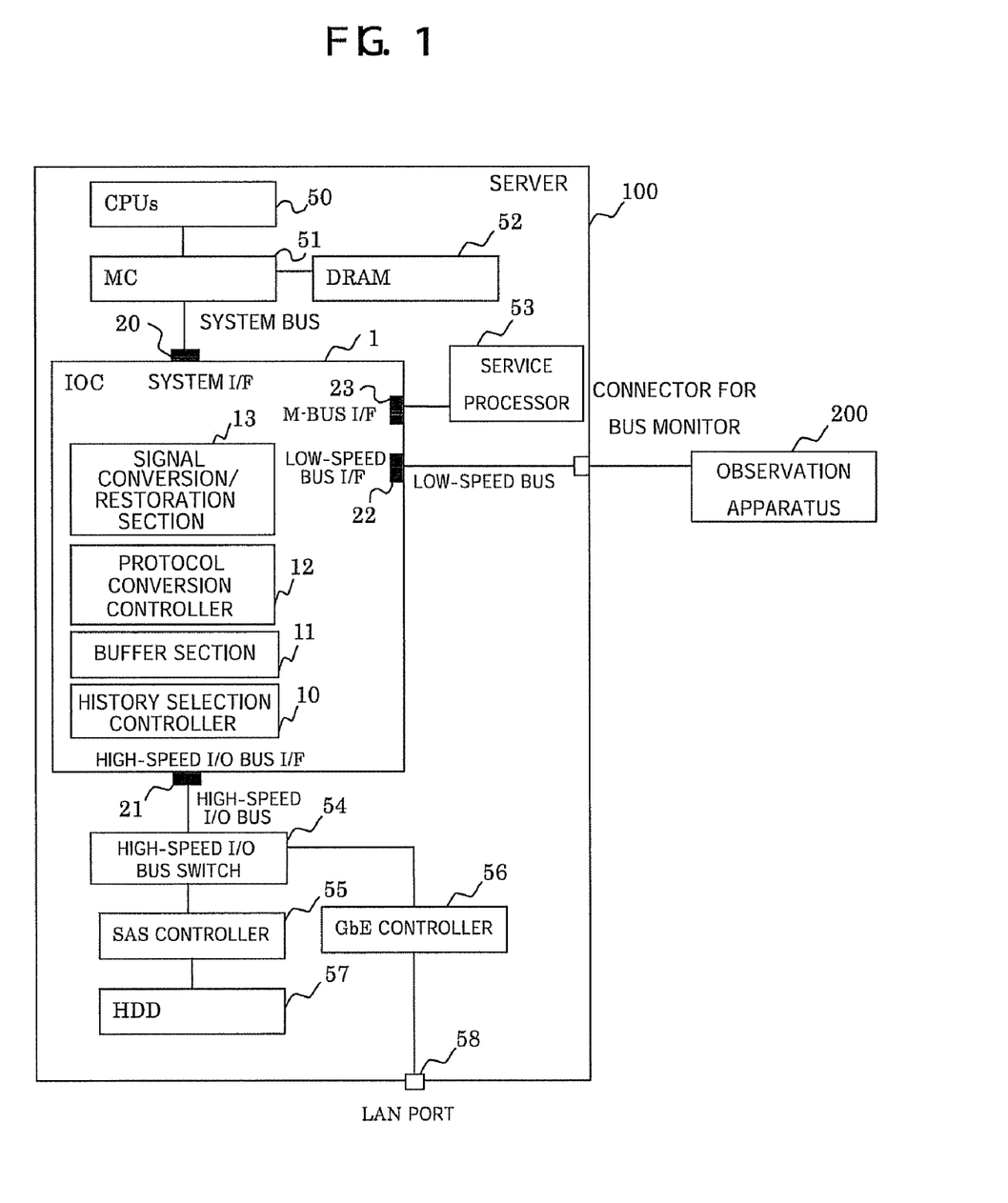
FIG. 1 is a block diagram illustrating an example of a configuration of a server according to an embodiment of the present invention.

FIG. 1 illustrates a configuration of a server according to an embodiment of the present invention. A server 100 (information processing apparatus) of FIG. 1 is connected to an observation apparatus 200 (analyzer), such as a general-purpose logic analyzer, by a connector for bus monitor.

The server 100 has CPUs 50, an MC (Memory Controller) 51, a DRAM (Dynamic Random Access Memory) 52, an IOC (Input Output Controller) 1 (data transfer apparatus), a service processor 53, a high-speed I/O bus switch 54, a SAS (Serial Attached SCSI) controller 55 (system controller), a GbE controller 56, an HDD (Hard Disk Drive) 57, and a LAN (Local Area Network) port 58.

The CPUs 50 are a plurality of central processing units, which are connected to the MC 51 through a system bus. The MC 51 is an LSI for controlling the operation (data read out, data write, refresh, etc.) of the DRAM 52 serving as a storage medium. The MC 51 is connected to the DRAM 52 and is further connected to the CPUs 50 and IOC 1 through the system bus.

The IOC 1 is an LSI mainly having a function of performing protocol conversion between the system bus and a high-speed I/O bus. The IOC 1 is connected to the high-speed I/O bus switch 54 through the high-speed I/O bus and further connected to the MC 51 through the system bus. An internal configuration of the IOC 1 will be described later.

The high-speed I/O bus switch 54 is a switch having a plurality of high-speed I/O bus interfaces and is connected to the IOC 1, GbE controller 56, and SAS controller 55 through the high-speed I/O bus. The GbE controller 56 is a network board compliant with the Gigabit Ethernet® network standard and performs I/O control of communication data from the LAN port 58. The SAS controller 55 enables a SAS connection and performs I/O control for the HDD 57. The high-speed I/O bus switch 54, GbE controller 56, and SAS controller 55 each have a high-speed bus interface.

The HDD 57 is a magnetic disk apparatus and stores data in a non-volatile manner. The service processor 53 is a management apparatus for making initial setting of the IOC 1, monitoring a state of the same, and managing the operations of components constituting the server 100. The service processor 53 is connected to the IOC 1 through a maintenance bus (hereinafter, referred to as "M-Bus").

A command issued from the CPUs 50 is transmitted to the high-speed I/O bus switch 54 through the MC 51, IOC 1 and high-speed I/O bus and is further transmitted to the SAS controller 55 and GbE controller 56. The DMA transfer from the SAS controller 55 and GbE controller 56 is transmitted to the DRAM 52 through the high-speed I/O bus, IOC 1, and MC 51. Transactions for the GbE controller 56 and SAS controller 55 sometimes flow in the high-speed I/O bus simultaneously.

Figure 2:
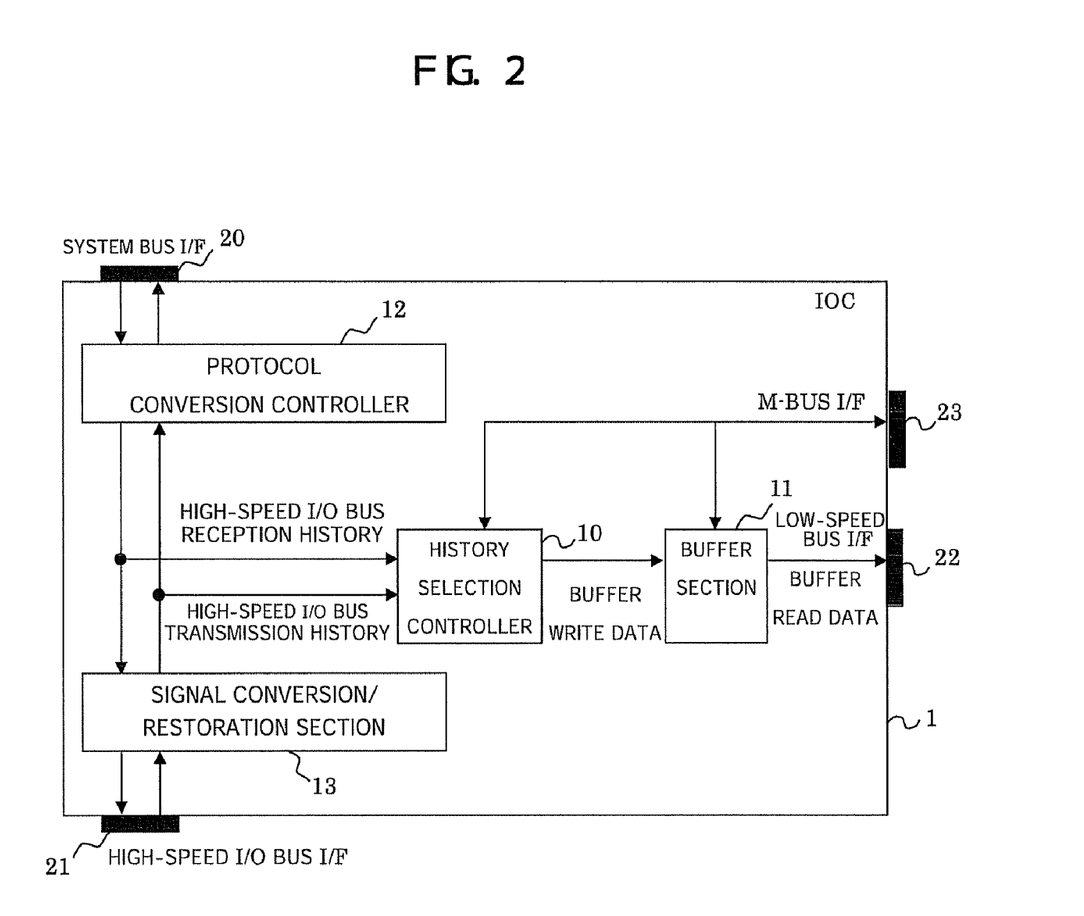
FIG. 2 is a block diagram illustrating an example of a configuration of an IOC according to the embodiment.

A configuration of the IOC 1 will be described with reference to FIG. 2. The IOC 1 has a history selection controller 10 (data selection controller), a buffer section 11 (history storage section), a protocol conversion controller 12 (bus signal conversion section), and a signal conversion/restoration section 13.

The history selection controller 10 selects part of transmission/reception data (transaction) transferred between the MC 51 (first controller) and high-speed I/O bus switch 54 (second controller). Setting on which data of the transmission/reception data is to be selected is made by the service processor 53 through the M-bus. The history selection controller 10 selects/acquires only information required for failure analysis so as to reduce information amount, thus allowing transmission of the transactions flowing in the high-speed I/O bus on a low-speed bus.

The buffer section 11, which is connected to the history selection controller 10, retains part of transmission/reception data selected by the history selection controller 10, and outputs the part of transmission/reception data retained to the observation apparatus 200 through a low-speed bus. Even when a large number of transactions are locally generated on the high-speed I/O bus, the transmission/reception history records needs to be transmitted to the observation apparatus 200 through a low-speed bus if at all possible. In order to cope with this situation, the buffer section 11 has a function of averaging transmission to the observation apparatus 200.

The protocol conversion controller 12 performs mutual protocol conversion of a bus signal on the system bus (first bus) and a bus signal on the high-speed I/O bus (second bus). The signal conversion/restoration section 13 performs signal conversion for enhancing signal integrity. As the signal conversion for enhancing signal integrity, the signal conversion/restoration section 13 performs signal conversion used in a high-speed serial bus, such as 10 B/8 B conversion or scramble.

The IOC 1 has a system bus interface 20, a high-speed I/O bus interface 21, a low-speed bus interface 22, and an M-Bus interface 23 so as to allow connection with respective buses.

The system bus interface 20 is a port (first port) for allowing connection with the MC 51 through the system bus. The high-speed I/O bus interface 21 is a port (second port) for allowing connection with the high-speed I/O bus switch 54 through the high-speed I/O bus.

The low-speed bus interface 22 is a port (third port) for allowing connection with the observation apparatus 200. The M-Bus interface 23 is a port fourth port for allowing connection with the service processor 53. Various operation settings of the IOC 1 are made by the service processor 53 through the M-Bus.

The low-speed bus interface 22 has 19 pins (16 pins+2 pins+1 pin) operating at 100 MHz. 16 pins out of the 19 pins output a transmission/reception transaction history flowing in the high-speed I/O bus and provide a bandwidth of 200 MB/sec. The bandwidth of the low-speed bus interface 22 corresponds to 1/10 of the bandwidth (2,000 MB/sec: 2.5 Gpbs, 8 lanes) of the high-speed I/O bus in one direction.

2 pins out of the 19 pins output additional information of the transmission/reception transaction history. The additional information differs in meaning between even and odd cycles. Four types of additional information (lost flag, header data flag, transmission/reception flag, and time stamp flag) are output in even and odd cycles (details of the additional information and flags will be described later). 1 pin of the 19 pins is used for outputting a stop signal to the recording operation of the observation apparatus 200.

The bandwidth (200 MB/sec) of the low-speed bus interface is a value calculated based on a bandwidth required in the case where the history selection controller selects for recording through the high-speed I/O bus, as the part of transmission/reception data, the header part of a transaction with a 16 B (hereinafter, B means byte) header size and a 128 B data size.

Figure 3:
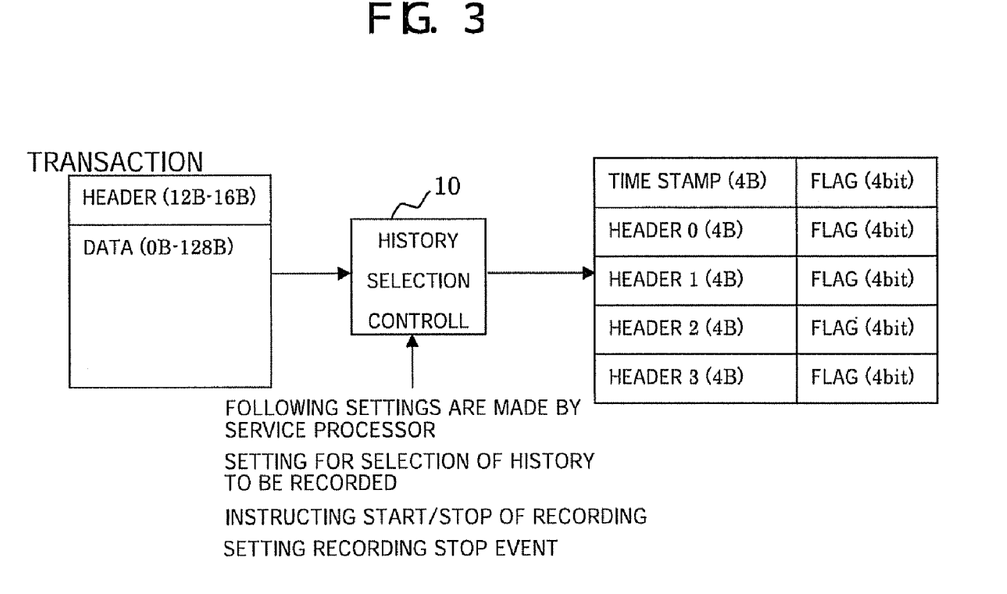
FIG. 3 is a view for explaining an example of operation of a history selection controller according to the embodiment.

Operation of the history selection controller 10 will next be described with reference to FIG. 3. A transaction on the high-speed I/O bus is composed of a header with a size of 12 B to 16 B and data with a size of 0 B to 128 B. For example, assuming that only the header information is selected for recording, as information required for failure analysis, from the high-speed I/O bus transaction composed of a 12 B header size and a 128 B data size, the information amount accounts for 8% of the total data amount (12 B÷(12 B+128 B)=0.08). With this configuration, it is possible to retain more information concerning the transaction with less storage capacity than in the case where the entire transaction data is retained for failure analysis.

How the data concerning the transaction is recorded is set by the service processor 53 through the M-Bus. Examples of a recording method that the service processor 53 can set include: to record the header of a reception transaction (transaction directed from the CPUs 50 to high-speed I/O bus switch 54); to record the first 4 B of the reception transaction data; to record the entire reception transaction data; to record the header of a transmission transaction (transaction directed from the high-speed I/O bus switch 54 to CPUs 50); to record the first 4 B of the transmission transaction data; to record the entire transmission transaction data; and the like. In FIG. 3, a case where only the header (4 B×4=16 B) information is recorded as the transaction data is illustrated.

In addition to the abovementioned selection of the transaction, the history selection controller 10 performs start/stop control of the history recording. The start/stop of the history recording is set or instructed by the service processor 53. The selection of a history stop event can also be set by the service processor 53. The history stop event is an event representing a case where a transaction including a specific address has been received, a case where a transaction including an error flag has been received, or the like. When such a history stop event has occurred, the history recording is stopped.

The history selection controller 10 also has a function of adding additional information to the transmission/reception history to be written in the buffer section 11. The additional information includes a header data flag indicating whether the selected data is the header information or data part of a transaction, a transmission/reception flag indicating whether the selected data is a reception transaction or transmission transaction, a lost flag indicating that the transmission/reception history is discarded by a writing operation to the buffer section 11 which is in a full state, a time stamp flag indicating whether the selected data is a time stamp or not, and a time stamp.

As the time stamp, a 32-bit counter value is used. The counter is incremented by 1 every 10 nsec and wraps round about every 43 sec. The time stamp is added to the head of each transaction.

In the writing operation to the buffer section 11, 128-bit (32-bit×4) transmission/reception history and 16-bit (4-bit×4) additional flag are written in bulk so as to cope with a case where transaction transmission, transaction reception, writing of a reception time stamp and transmission time stamp occur simultaneously.

Figure 4:
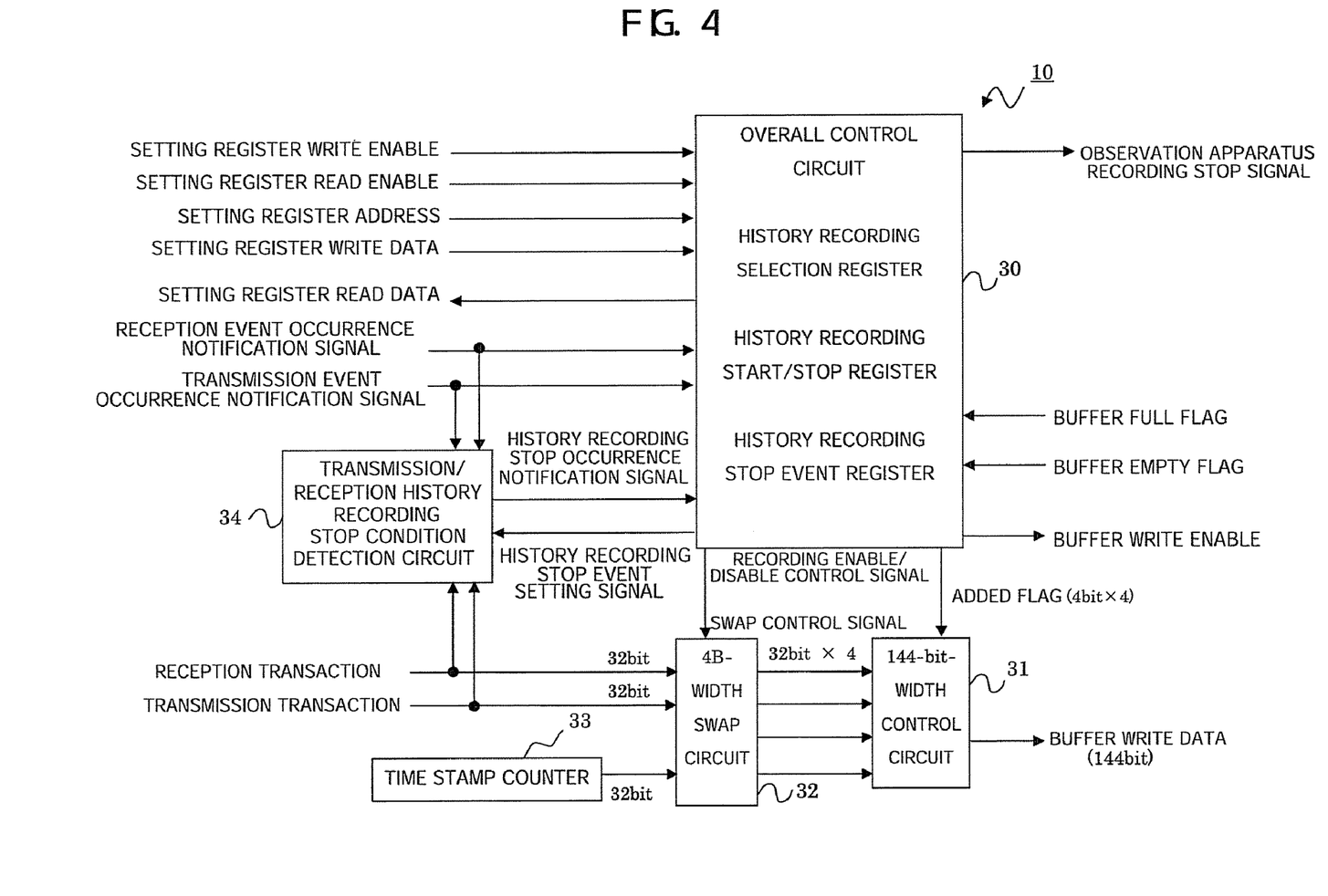
FIG. 4 is a view illustrating an example of a circuit configuration of the history selection controller according to the embodiment.

FIG. 4 illustrates a circuit configuration diagram of the history selection controller 10. The history selection controller 10 has an overall control circuit 30 for controlling the entire operation of the history selection controller 10. The history selection controller 10 further has a transmission/reception history recording stop condition detection circuit 34 that detects whether a reception (transmission) transaction occurring on the high-speed I/O bus is the history stop event and, if so, transmits a signal for stopping the history recording to the overall control circuit 30.

The history selection controller 10 further has a 4 B-width swap circuit 32 that extracts part of data (in the case of the present embodiment, 32-bit data) from the reception transaction and transmission transaction, respectively and acquires a time stamp from a time stamp counter 33 for managing time. The history selection controller 10 further has a 144-bit-width control circuit 31 that acquires four 32-bit data from the 4 B-width swap circuit 32, as well as acquires flags (four 4-bit data) from the overall control circuit 30. The data collected by the 144-bit-width control circuit 31 corresponds to buffer write data which is data to be output to the buffer section 11.

A further description will be given of the overall control circuit 30. The overall control circuit 30 has, as setting registers that can be accessed through the M-Bus, a history recording selection register (setting information storage section) that retains setting information concerning the selection of the transmission/reception data on the high-speed I/O bus, a history recording start/stop register that controls the start and stop of the history recording, and a history recording stop event register that retains information concerning a history recording stop event. Further, the overall control circuit 30 receives (or transmits), as control signals and control information to be output to the history recording selection register, a setting register write enable signal, a setting register read enable signal, a setting register address, a setting register write data, and setting register read data.

Figure 5:
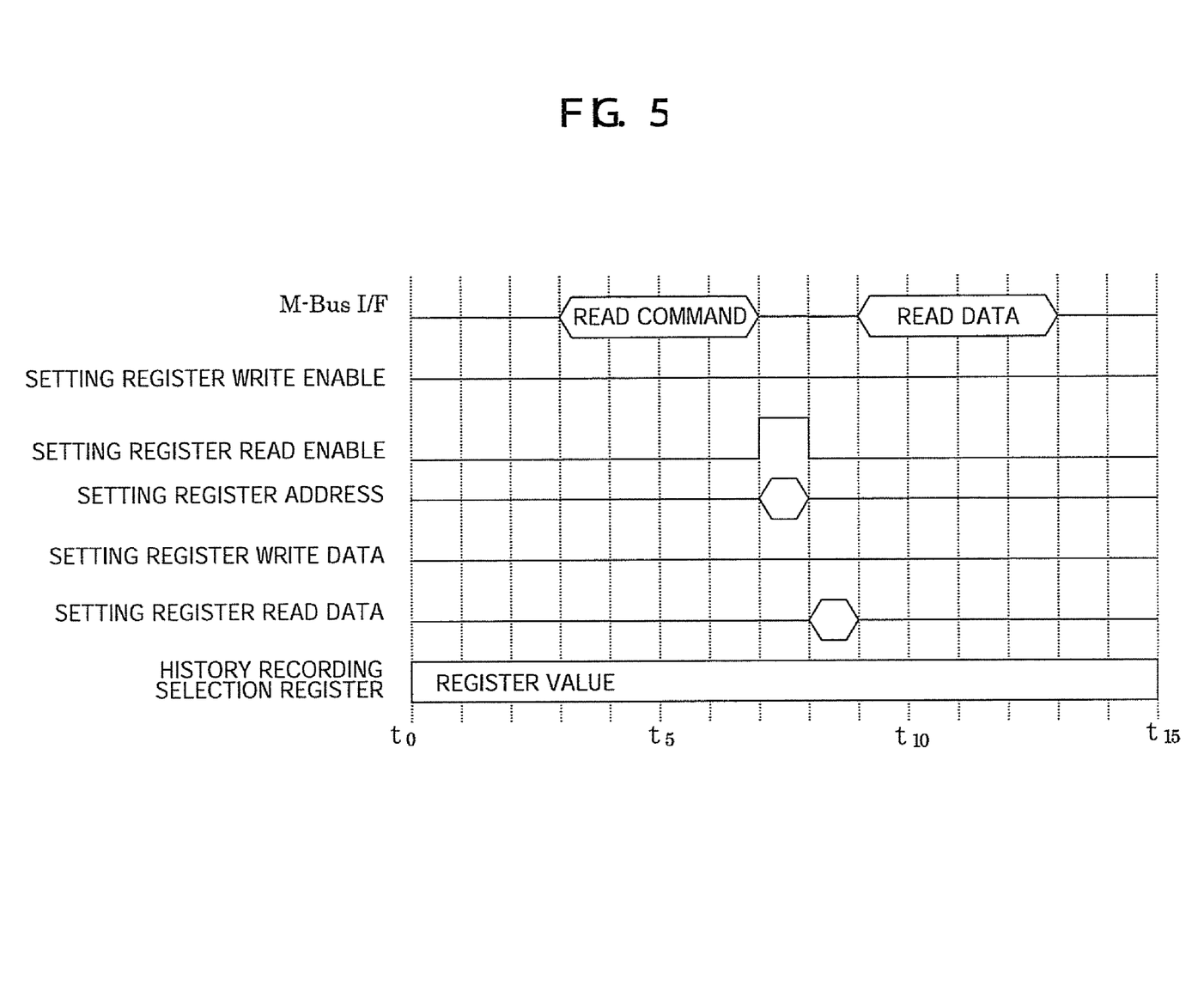
FIG. 5 is a view illustrating an example of a time chart representing processing of reading register information set in a history recording selection register according to the embodiment.

A time chart representing processing of reading register information set in the history recording selection register using the above control signals and control information is illustrated in FIG. 5.

When the M-Bus interface 23 receives a command to read setting information (time period from $t_3$ to $t_7$), the history selection controller 10 outputs the setting register read enable signal to the overall control circuit 30, as well as outputs the setting register address indicating in which register the target setting information is retained (time period from $t_7$ to $t_8$). At this timing, information retained in the history recording selection register is output, as the setting registry data, from the overall control circuit 30 (time period from $t_8$ to $t_9$) and input to the service processor 53 through the M-Bus interface 23 (time period from $t_9$ to $t_{13}$). Since the time chart illustrated in FIG. 5 represents read processing, the setting register write enable signal and setting register write data are not input or output in this case.

Figure 6:
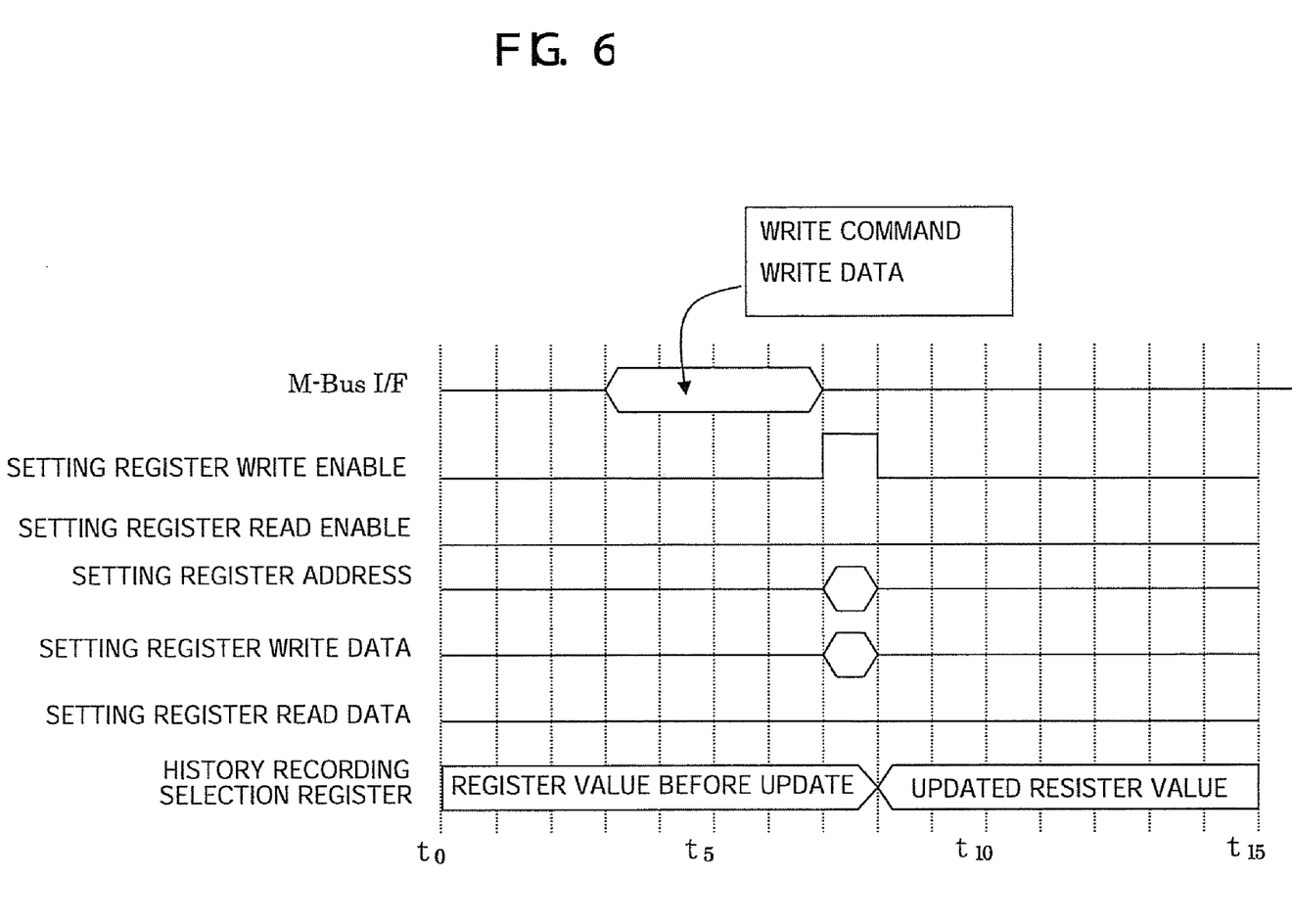
FIG. 6 is a view illustrating an example of a time chart representing processing of writing register information in the history recording selection register according to the embodiment.

A time chart representing processing of writing register information set in the history recording selection register is illustrated in FIG. 6.

When the M-Bus interface 23 receives a command to write setting information and write data (time period from $t_3$ to $t_7$), the history selection controller 10 outputs the setting register write enable signal to the overall control circuit 30, as well as outputs the setting register address indicating in which register the target setting information is to be retained and setting register write data (write data from the M-Bus interface 23) (time period from $t_7$ to $t_8$). At the timing of $t_8$, the value of the history recording selection register is updated.

Further, in the case where any transmission/reception has occurred on the high-speed I/O bus or where the history recording stop event has occurred, reception event occurrence notification signal and transmission event occurrence notification signal are transmitted to the overall control circuit 30 and transmission/reception history recording stop condition detection circuit 34, and reception transaction and transmission transaction are transmitted to the transmission/reception history recording stop condition detection circuit 34 and 4 B-width swap circuit 32.

Further, based on a buffer empty flag signal and a buffer full flag signal which indicate whether the buffer section 11 is in a full state or in an empty state, the buffer write enable signal and buffer write data are transmitted to the buffer section 11.

When the history stop event has occurred and the overall control circuit 30 has received a history recording stop occurrence notification signal from the transmission/reception history recording stop condition detection circuit 34, the history recording is stopped. When the history recording is stopped in this way and data stored in the buffer section 11 is transmitted to the observation apparatus 200 in this state, the buffer section 11 becomes empty. When the buffer section 11 becomes empty, the overall control circuit 30 transmits an observation apparatus recording stop signal for instructing the observation apparatus 200 to stop the history recording.

Further, the overall control circuit 30 outputs to the transmission/reception history recording stop condition detection circuit 34 the setting of the history recording stop event made by the service processor 53 as a history recording stop event signal. The transmission/reception history recording stop condition detection circuit 34 detects the history stop event based on the received history recording stop event signal.

Figure 7:
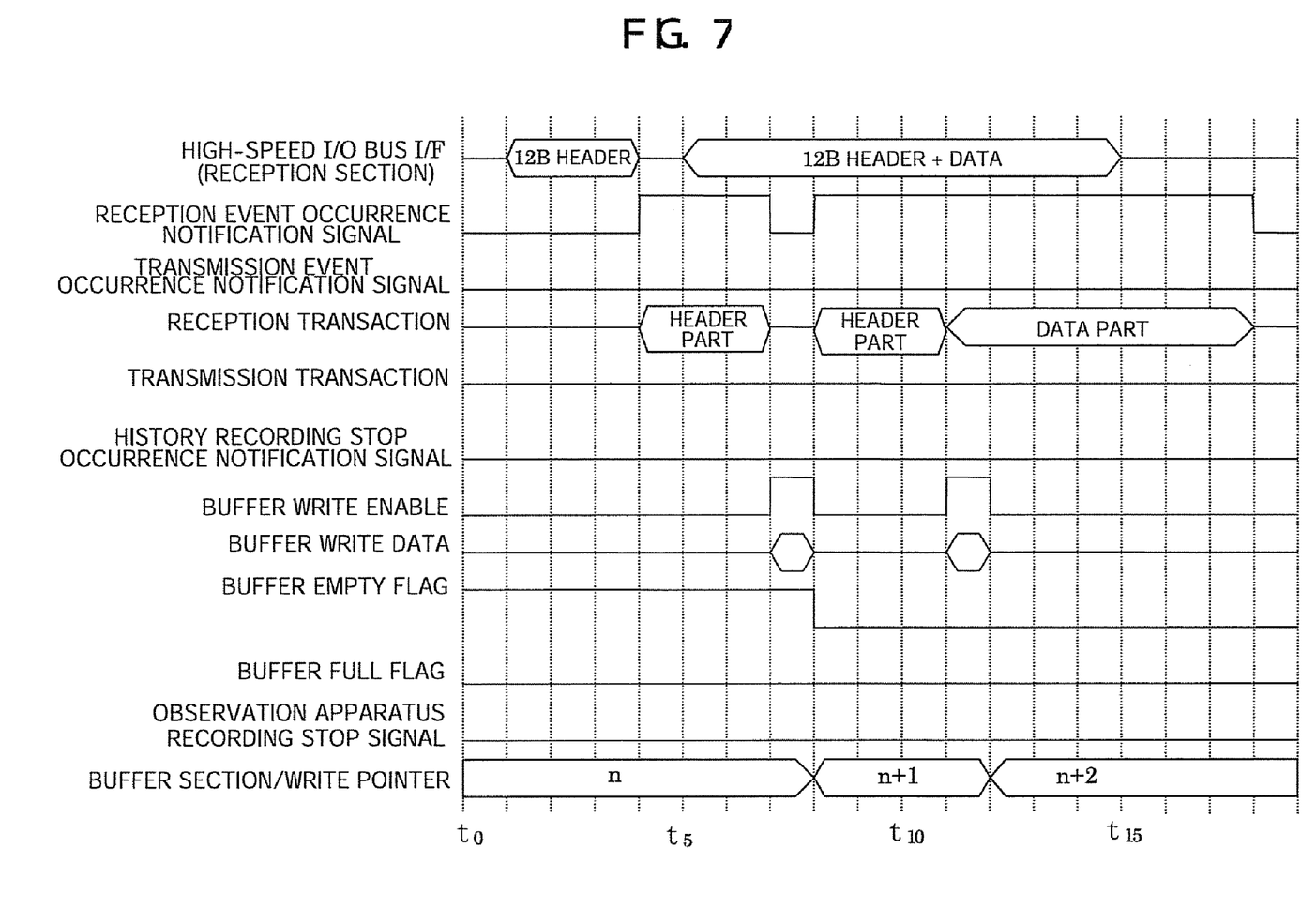
FIG. 7 is a time chart illustrating an example of operation the history selection controller according to the embodiment performed when a transaction transmission/reception has occurred on a high-speed I/O bus in the IOC.

Using the control signals and control information, operation the history selection controller 10 performed when the transaction transmission/reception has occurred on the high-speed I/O bus in the IOC 1 is illustrated in a time chart of FIG. 7. The time chart of FIG. 7 represents a case where the buffer section 11, which is empty of history record, receives two transactions through the high-speed I/O bus interface 21 and writes only the header parts of the transactions. The first transaction of the two includes only a 12 B header (data is 0 B) and second transaction includes a 12 B header and data.

The high-speed bus interface 21 receives the first transaction including only the header (time period from $t_1$ to $t_4$). Thereafter, the overall control circuit 30 receives the reception event occurrence notification signal, and the 4 B-width swap circuit 32 receives the header part (reception transaction) that high-speed I/O bus interface 21 has received (time period from $t_4$ to $t_7$). Thereafter, the overall control circuit 30 transmits the buffer write enable signal to the buffer section 11, and the 144-bit-width control circuit 31 transmits to the buffer section 11 buffer write data obtained by adding the additional information to the header part (time period from $t_7$ to $t_8$). Reception of the buffer empty flag is stopped at the timing of t8, and a write pointer value (to be described later) of the buffer section 11 is incremented by 1.

When the second transaction including the header part and data has occurred, the high-speed I/O bus interface 21 receives the second transaction (time period $t_5$ to $t_{15}$). Thereafter, the overall control circuit 30 receives the reception event occurrence notification signal (time period from $t_8$ to $t_{18}$), and the 4 B-width swap circuit 32 divides the transaction that the high-speed I/O bus interface 21 has received into the header part and data part and transmits only the header part to the 144-bit-width control circuit 31 (time period $t_8$ to $t_{18}$). Further, the overall control circuit 30 outputs the buffer write enable signal to the buffer section 11, and the 144-bit-width control circuit 31 transmits to the buffer section 11 buffer write data obtained by adding the additional information to the data including only the header part (time period from $t_{11}$ to $t_{12}$). At the timing of t12, a write pointer value (to be described later) of the buffer section 11 is incremented by 1.

Figure 8:
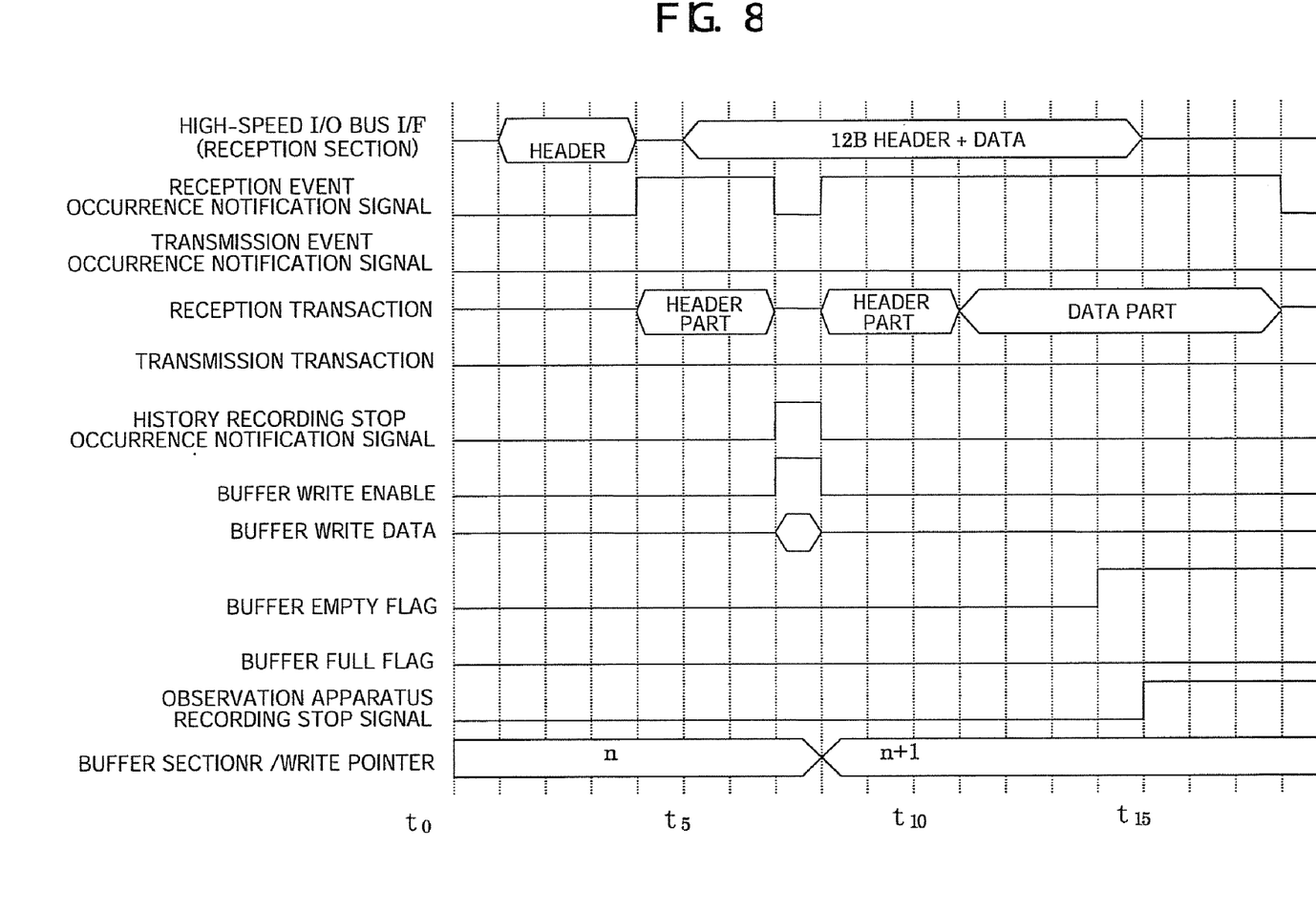
FIG. 8 is an example of a time chart representing a case where a history recording stop event according to the embodiment has occurred.

A time chart representing a case where the history recording stop event has occurred is illustrated in FIG. 8. As in the case of the time chart of FIG. 7, the time chart of FIG. 8 represents a case where the buffer section 11 receives two transactions through the high-speed I/O bus interface 21 and writes only the header parts of the transactions. The first transaction of the two includes only a 12 B header and second transaction includes a 12 B header and data. In FIG. 8, the header information of the transaction received first matches the history stop condition and, accordingly, the history recording stop is made.

The high-speed I/O bus interface 21 receives the first transaction including only the header (time period from $t_1$ to $t_4$). Thereafter, the overall control circuit 30 and transmission/reception history recording stop condition detection circuit 34 receive the reception event occurrence notification signal, and the 4 B-width swap is circuit 32 and transmission/reception history recording stop condition detection circuit 34 receive the header part (reception transaction) that high-speed bus interface 21 has received (time period from $t_4$ to $t_7$). Thereafter, the overall control circuit 30 transmits the buffer write enable signal to the buffer section 11, and the 144-bit-width control circuit 31 transmits to the buffer section 11 the buffer write data (time period from $t_7$ to $t_8$).

Since the reception transaction data matches the history stop condition, the transmission/reception history recording stop condition detection circuit 34 outputs the history recording stop occurrence notification signal to the overall control circuit 30 (time period $t_7$ to $t_8$). After receiving the history recording stop occurrence notification signal, the overall control circuit 30 outputs a swap control signal to the 4 B-width swap circuit 32 to thereby prevent the 4 B-width swap circuit 32 from outputting data to the 144-bit-width control circuit 31. Thus, even when the high-speed I/O bus interface 21 has received the second transaction, the buffer write enable signal and buffer write data are not transmitted to the buffer section 11.

Thereafter, when the buffer section 11 has become empty of data, and the buffer empty flag signal has been transmitted to the overall control circuit 30 (time period $t_{14}$), the overall control circuit 30 can determine that the last history record data has been output to the observation apparatus 200. Then, the overall control circuit 30 transmits the observation apparatus recording stop signal to the observation apparatus 200 (time period $t_{15}$) to thereby stop data collection operation of the observation apparatus 200.

Figure 9:
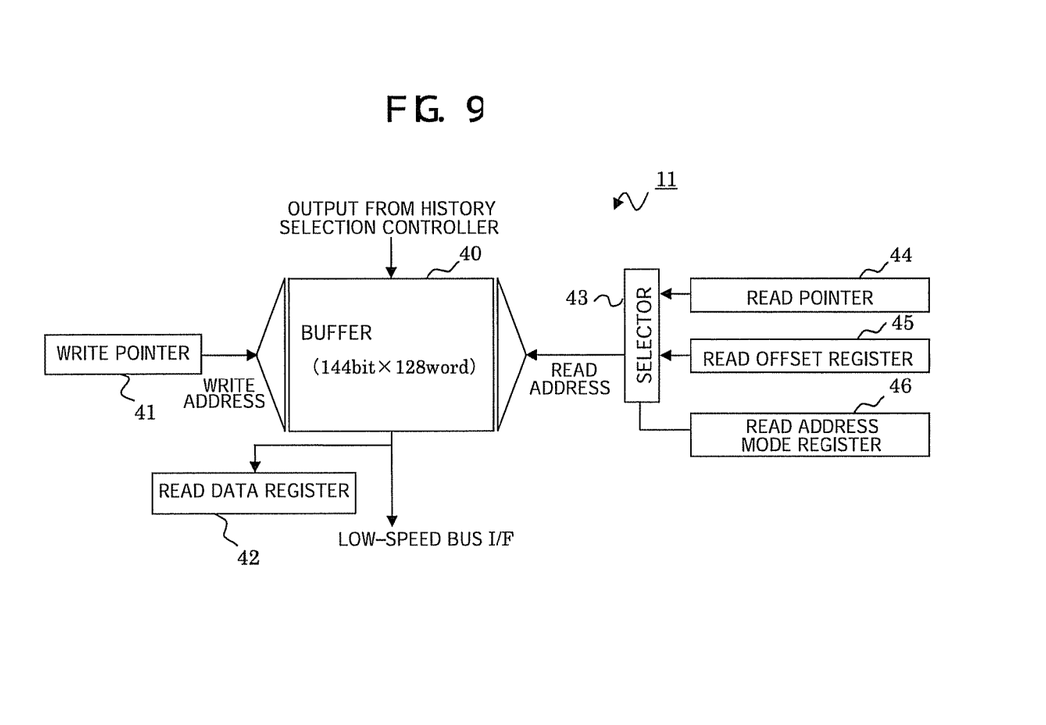
FIG. 9 is a view for explaining an example of a configuration of a buffer section according to the embodiment.

Details of the configuration of the buffer section 11 will be described with reference to FIG. 9.

The buffer section 11 has a buffer 40 that retains the data (buffer write data) output from the history selection controller 10, a write pointer 41 that retains an address according to which the data is written into the buffer 40, and a read pointer 44 that retains an address according to which the data is read from the buffer 40.

The buffer section 11 further has, as registers that can be accessed through the M-Bus, a read data register 42, a read offset register 45, and a read address mode register 46. By using the above registers, the buffer section 11 can serve as a trace memory like the conventional technique. That is, in the case where the history recording to the buffer section 11 is in stopped state, the transmission/reception history that has been written into the buffer section 11 can be read into the service processor 53 through the M-Bus. The buffer section 11 further has a selector 43 for selecting an output from outputs of the read pointer 44 and read offset register 45 by read address mode register 46.

When a transaction transmission/reception occurs on the high-speed I/O bus in the history recording state and, correspondingly, data is written into the buffer 40, the address retained in the write pointer 41 is incremented by 1. When data stored in the buffer 40 is transmitted to the low-speed bus interface 22, the address retained in the read pointer 44 is incremented by 1. When there is a difference between the address retained in the write pointer 41 and address retained in the read pointer 44 in the history recording state, data stored in the buffer 40 is read out, causing the address of the read pointer 44 to be incremented by 1.

The buffer section 11 also has a function of preventing the transaction history to be discarded in the case where transactions concentrate on a specific time. Requests issued to the buffer section 11 include a write request and a read request. The write request includes data, while the read request does not include data. Although the amount of the history data recorded in association with the write request is reduced in the case where the history selection controller 10 has selected a mode in which data itself is not recorded, the amount of history records to be output to the observation apparatus 200 in association with the read request is not changed since the history record in the buffer section 11 is output unless and until there is no history record in the buffer 11. Thus, averaging is performed by the buffer 11 in the case where read requests concentrate on a specific time.

In the present embodiment, data is written into the buffer 40 with a 144-bit-width, and the buffer 40 can retain 128 words of 144 bits each. In data reading, it is necessary to meet the specification (20-bit-width) of the low-speed bus interface 22 and, accordingly, 18-bit-width data is read from the buffer 40 in 8 cycles. The data reading operation of 8 cycles is controlled with the first, third, fifth, and seventh cycles set as odd-number cycles, and second, fourth, sixth, and eighth cycles set as even-number cycles.

Figure 10:
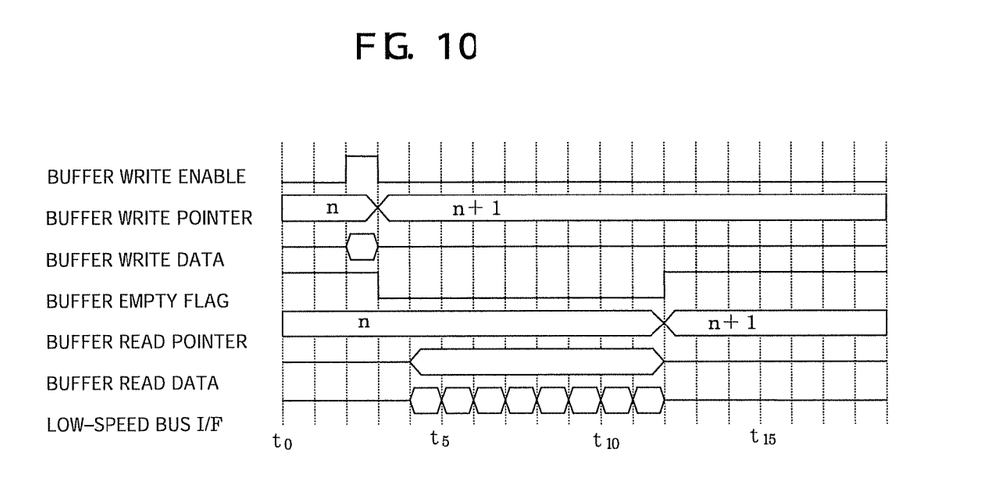
FIG. 10 is a time chart illustrating an example of operation of the buffer section according to the embodiment.

Operation of the buffer section 11 is illustrated in a time chart of FIG. 10. The time chart of FIG. 10 represents a case where one history record has occurred in a state where the buffer section 11 is empty and where the one history record is output from the buffer section 11 to the low-speed bus interface 22.

The buffer section 11 receives the buffer write enable signal from the history selection controller 10, as well as receives the buffer write data from the same (time period from $t_2$ to $t_3$). The address retained in the write pointer 41 is incremented by 1 at the timing when the buffer 40 has acquired the buffer write data (time period $t_3$). Since the buffer section 11 is not in an empty state, transmission of the buffer empty flag to the history selection controller 10 is stopped (time period $t_3$).

The buffer section 11 outputs, as the buffer read data, the buffer write data to the observation apparatus 200 through the low-speed bus interface 22 (time period from $t_4$ to $t_{12}$). At this time, as described above, the buffer section 11 outputs the buffer read data to the low-speed bus interface in 8 cycles (time period from $t_4$ to $t_{12}$). At the timing when the output of the buffer read data has been completed, the address retained in the read pointer 44 is incremented by 1 ($t_{12}$).

Figure 11:
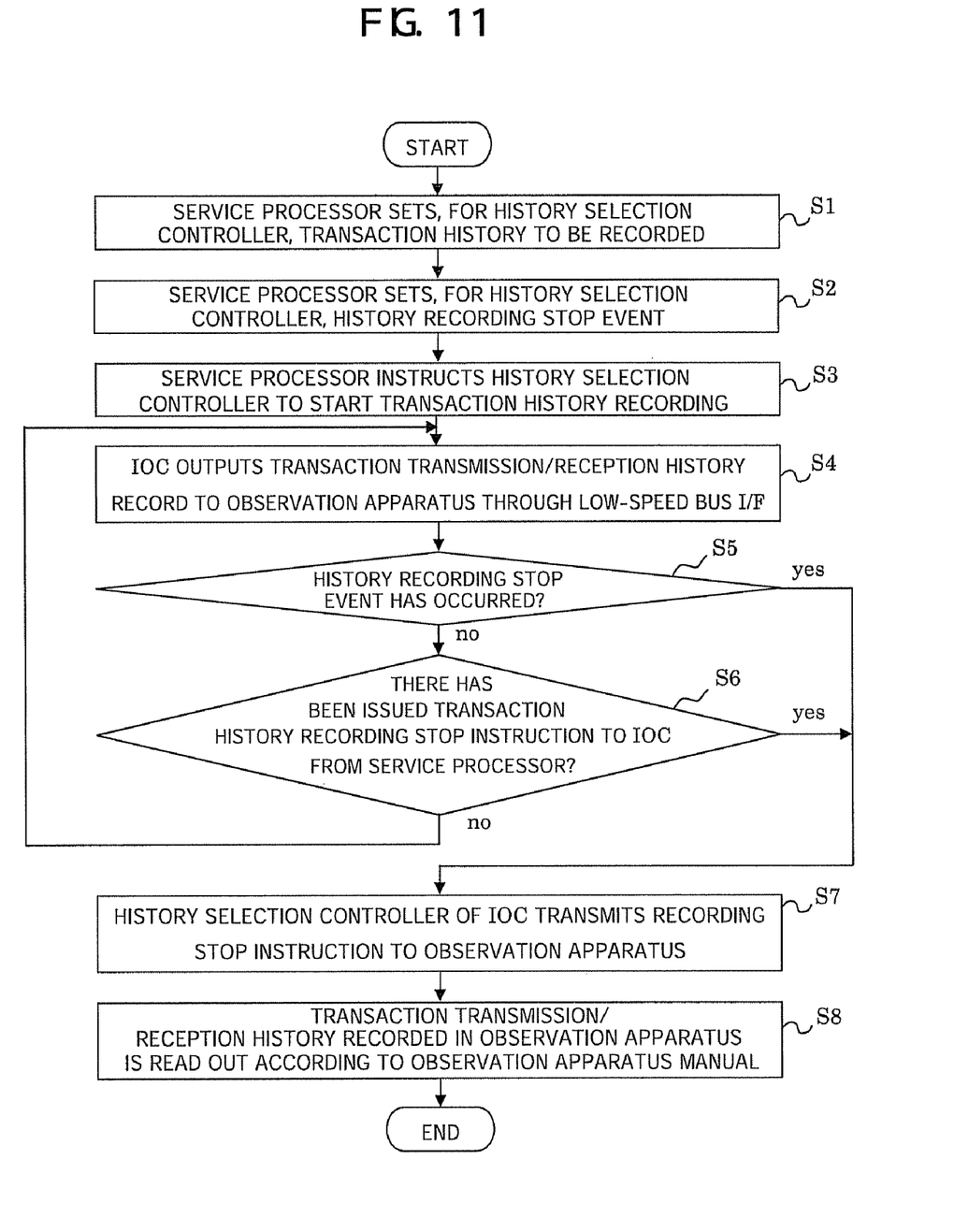
FIG. 11 is a flowchart illustrating an example of the high-speed I/O bus transaction transmission/reception history recording operation of the IOC according to the embodiment.

The high-speed I/O bus transaction transmission/reception history recording operation of the IOC 1 according to the present embodiment will be described with reference to a flowchart of FIG. 11.

The service processor 53 sets, for the history selection controller 10 through the M-Bus, a recording mode that specifying which data is to be recorded as a transaction (step S1). Concretely, the service processor 53 sets a predetermined value that has previously been associated with a given recording mode in the history recording selection register in the history selection controller 10. At normal operation time, a setting value specifying a recording mode in which only the header part of the transaction is recorded is set in the history recording selection register. When any failure has occurred, the setting value may be changed to another one depending on the type of the failure. For example, a setting value specifying a recording mode in which only a part of the header of the transaction, part of the data of the transaction, or the entire transaction may be set depending on the type of the failure.

Similarly, through the M-Bus, the service processor 53 sets the history recording stop event for the history selection controller 10 (step S2). In the same manner as described above, the service processor 53 sets a predetermined value that has previously been associated with a given recording stop event in the history recording stop event register in the history selection controller 10.

The service processor 53 then instructs the IOC 1 to start transaction history recording (step S3). Concretely, the service processor 53 sets a value indicating the start of the transaction history recording in the history recording start/stop register in the history selection controller 10. After the start of the history recording, the history selection controller 10 receives the history of the transaction transmitted/received through the high-speed I/O bus. In the case of a transaction that the IOC 1 transmits to the high-speed I/O bus, the transaction history received by the history selection controller 10 has a format that has not yet been subjected to signal conversion that the signal conversion/restoration section 13 performs for enhancing signal integrity. On the other hand, in the case of a transaction that the IOC 1 receives from the high-speed I/O bus, the transaction history received by the history selection controller 10 has a format that has been subjected to the signal conversion, thus eliminating the need for providing a protocol-dependent signal restoration function in the observation apparatus 200.

Then, based on the value retained in the history recording selection register, history information to be recorded is extracted from the transaction received by the history selection controller 10 and transmitted to the buffer section 11 as buffer write data. At this time, a time stamp is added to the buffer write data for identifying the time relation between the transactions transmitted/received.

The buffer section 11 writes therein the buffer write data transmitted from the history selection controller 10. If the buffer section 11 is in a full state, the transaction transmission/reception history records stored in the buffer section 11 are overwritten in chronological order. The history record overwritten by a new history record is lost. At this time, a flag (lost flag) indicating occurrence of the lost is written in the buffer 40 as additional information.

The buffer section 11 transmits the stored transaction transmission/reception history record to the observation apparatus 200 through the low-speed bus interface unless and until there is no history record in the buffer 40, and the observation apparatus 200 records therein the received transaction transmission/reception history record (step S4).

Then, a determination on whether a history recording stop event, such as exception handling, has occurred (step S5) and determination on whether there has been issued a transaction history recording stop instruction to the history selection controller 10 from the service processor 53 (step S6) are made. In the case where a history recording stop event, such as exception handling, has occurred (Yes in step S5), or in the case where there has been issued a transaction history recording stop instruction (Yes in step S6), writing of the transaction history in the buffer section 11 is stopped.

In the case where the buffer section 11 becomes empty with the stop of the writing of the transaction history, the history selection controller 10 transmits a recording stop instruction to the observation apparatus 200 through the low-speed bus interface and, accordingly, recording operation for the observation apparatus 200 is stopped (step S7). Afterward, the transaction transmission/reception history recorded in the observation apparatus 200 is read out by a user according to a predetermined procedure (step S8).

Here, a case where the buffer section 11 is used as a trace memory like the conventional technique will be described. The service processor 53 sets a predetermined value in the read address mode register 46 of the IOC 1 in a state where the transaction history recording is stopped to thereby set a mode in which the read address of the buffer section 11 is controlled from the service processor 53.

Thereafter, the service processor 53 sets, in the read offset register 45, the address value of the buffer 40 from which the transmission/reception history is read out. The service processor 53 reads out a value output from the buffer 40 though the read data register 42. The service processor 53 repeats the setting operation of the read offset register 45 and readout operation from the read data register 42 by the number corresponding to the capacity of the buffer 40.

According to the present embodiment, the following advantages can be obtained. That is, a large amount of high-speed bus transmission/reception history can be recorded with a low-cost structure, thereby facilitating failure analysis. Further, the transmission/reception history can be recorded without directly probing the high-speed bus, thereby preventing deterioration of a high-speed bus waveform.

Since the bus connecting the first and second controllers is not direly probed, the waveform of the bus is not deteriorated.

Further, a configuration in which only part of the transmission/reception data is collected allows recording of a large amount of bus transmission/reception history between the first and second controllers, thereby facilitating failure analysis.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A data transfer apparatus comprising:
a first port connected to a first controller;
a second port connected to a second controller;
a data selection controller that selects part of transmission/reception data transferred between the first controller and second controller;
a history storage section that is connected to the data selection controller and retains the part of transmission/reception data selected by the data selection controller;
a third port that outputs the part of transmission/reception data retained by the history storage section to an analysis apparatus;
a setting information storage section that is connected to a system controller for controlling the data transfer apparatus and stores setting information concerning which part of the transmission/reception data is to be selected by the data selection controller and thereby retained in the history storage section; and
a fourth port that connects the data selection controller and the system controller,
wherein the setting information is set by the system controller through the fourth port, and the history storage section functions as a buffer storing data output to the analysis apparatus via the third port.

2. The data transfer apparatus according to claim 1, further comprising a bus signal conversion section that performs mutual conversion of a first bus signal on a first bus connecting the first controller and the first port and a second bus signal on a second bus connecting the second controller and the second port.

3. The data transfer apparatus according to claim 2, wherein
data transfer speed of a third bus connected to the third port provided in the data transfer apparatus is lower than data transfer speed of the first and second buses.

4. The data transfer apparatus according to claim 1, wherein the part of the transmission/reception data is header information of the data.

5. An information processing apparatus comprising a first controller, a second controller, and a data transfer apparatus connecting the first and second controllers, the data transfer apparatus comprising:
a first port connected to the first controller;
a second port connected to the second controller;
a data selection controller that selects part of transmission/reception data transferred between the first controller and the second controller;

a history storage section that is connected to the data selection controller and retains the part of transmission/reception data selected by the data selection controller;

a third port that outputs the part of transmission/reception data retained by the history storage section to an analysis apparatus;

a setting information storage section that is connected to a system controller for controlling the data transfer apparatus and stores setting information concerning which part of the transmission/reception data is to be selected by the data selection controller and thereby retained in the history storage section; and a fourth port that connects the data selection controller and the system controller, wherein the setting information is set by the system controller through the fourth port, and the history storage section functions as a buffer storing data output to the analysis apparatus via the third port.

6. The information processing apparatus according to claim 5, wherein the data transfer apparatus further comprises a bus signal conversion section that performs mutual conversion of a first bus signal on a first bus connecting the first controller and the first port and a second bus signal on a second bus connecting the second controller and the second port.

7. The information processing apparatus according to claim 6, wherein data transfer speed of a third bus connected to the third port provided in the data transfer apparatus is lower than data transfer speed of the first and second buses.

8. The information processing apparatus according to claim 5, wherein the part of the transmission/reception data is header information of the data.

9. A data transfer method comprising:

selecting part of transmission/reception data transferred between a first port connected to a first controller and a second port connected to a second controller;

retaining the part of transmission/reception data selected in said selecting;

outputting the part of transmission/reception data retained in said retaining to a third port connected to an analysis apparatus;

storing setting information concerning the selection of the transmission/reception data, wherein in said selecting, the part of transmission/reception data is selected based on the setting information stored in said storing, and in said retaining, the transmission/reception data output to the analysis apparatus via the third port is buffered.

10. The data transfer method according to claim 9, further comprising performing mutual conversion of a first bus signal on a first bus connecting the first controller and the first port and a second bus signal on a second bus connecting the second controller and the second port.

11. The data transfer method according to claim 10, wherein data transfer speed of a third bus connecting the analysis apparatus and the third port is lower than data transfer speed of the first and second buses.

12. The data transfer method according to claim 9, wherein the part of the transmission/reception data is header information of the data.

* * * * *